(12) United States Patent
Sercovich

(10) Patent No.: US 12,528,174 B2
(45) Date of Patent: Jan. 20, 2026

(54) UNIVERSAL ATTACHABLE WATER DIRECTING DEVICE FOR POWER TOOLS

(71) Applicant: HYDRO-TAIL LLC, Metairie, LA (US)

(72) Inventor: Ronald Sercovich, Kenner, LA (US)

( * ) Notice: Subject to any disclaimer, the term of this patent is extended or adjusted under 35 U.S.C. 154(b) by 0 days.

(21) Appl. No.: 18/241,779

(22) Filed: Sep. 1, 2023

(65) Prior Publication Data

US 2023/0405791 A1  Dec. 21, 2023

(51) Int. Cl.
*B25F 5/00* (2006.01)

(52) U.S. Cl.
CPC .................... *B25F 5/008* (2013.01)

(58) Field of Classification Search
CPC ......... B25F 5/008; B23Q 11/00; B24B 55/00; B24B 55/02; B28D 5/0076; B28D 7/02; F16L 11/14; F16L 33/228
See application file for complete search history.

(56) References Cited

U.S. PATENT DOCUMENTS

| | | | | |
|---|---|---|---|---|
| 1,179,575 A * | 4/1916 | Sundh | ................... | F16L 11/16 138/131 |
| 1,651,022 A * | 11/1927 | Fulton | ................... | B29D 23/001 138/135 |
| 2,121,624 A * | 6/1938 | Cowles | ............... | F16L 33/2076 29/508 |
| 2,166,448 A * | 7/1939 | Schuknecht | ............ | F16L 35/00 285/256 |
| 2,455,113 A * | 11/1948 | Coates | ................... | B23Q 11/10 29/DIG. 88 |
| 2,540,203 A * | 2/1951 | Hatcher, Sr. | ............ | F16L 11/10 280/421 |
| 2,807,502 A * | 9/1957 | Tharp | ....................... | E03F 9/00 239/588 |
| 2,894,536 A * | 7/1959 | Arnot | ...................... | F16L 11/10 138/139 |
| 3,088,756 A * | 5/1963 | May | ........................ | F16L 35/00 285/116 |
| 3,256,647 A * | 6/1966 | Hutton | ................... | B24B 55/02 D15/126 |
| 3,398,609 A * | 8/1968 | Schott | .................... | B23Q 11/10 239/289 |
| 3,868,195 A * | 2/1975 | Anderson | .......... | B23Q 11/1076 184/6.26 |

(Continued)

*Primary Examiner* — Dariush Seif
(74) *Attorney, Agent, or Firm* — Fargo Patent & Business Law; Thomas Kading

(57) ABSTRACT

A universal water directing device for supplying water to power tools is provided comprising an inner tube for supplying controlled water to a power tool and an outer coil wounded around the inner tube for securing the inner tube tightly in place. The universal water directing device comprises a pressure control unit detachably attached to a nozzle at an outlet of the water-supplying tube for adjusting the pressure of water supplied to the power tool while the power tool is being used. The device is removably fastened to a hand-held power tool and is configured to provide dust-free cutting, grinding, and/or polishing action. The water directing device is a portable device that can be attached to any hand-held power tool such as saws, drillers, and grinders thereof. The water directing device includes a flow valve to control the speed and flow rate of the water feed.

12 Claims, 7 Drawing Sheets

(56) References Cited

U.S. PATENT DOCUMENTS

| | | | | |
|---|---|---|---|---|
| 3,896,783 A * | 7/1975 | Manning | B23Q 11/10 | 451/450 |
| 3,919,026 A * | 11/1975 | Mizutani | B29C 53/785 | 156/173 |
| 4,517,404 A * | 5/1985 | Hughes | A47L 9/24 | 138/109 |
| 4,570,609 A * | 2/1986 | Hogue | B23Q 11/005 | 451/450 |
| 4,782,591 A * | 11/1988 | DeVito | B24B 55/02 | 30/388 |
| 5,004,382 A * | 4/1991 | Yoshino | B28D 1/041 | 125/20 |
| 5,588,469 A * | 12/1996 | Kakiuchi | F16L 11/04 | 138/125 |
| 5,601,893 A * | 2/1997 | Strassel | F16L 11/14 | 138/131 |
| 5,620,140 A * | 4/1997 | Utter | B05B 15/62 | 239/153 |
| 5,780,132 A * | 7/1998 | Saitoh | B32B 38/0008 | 428/476.3 |
| 5,826,478 A * | 10/1998 | Zerrer | B05B 15/62 | 451/450 |
| 5,944,263 A * | 8/1999 | Lucco | B05B 15/654 | 239/289 |
| 5,957,765 A * | 9/1999 | Kimbel | B23D 67/06 | 451/356 |
| 5,988,226 A * | 11/1999 | Matthews | F16L 11/12 | 138/109 |
| 6,117,257 A * | 9/2000 | Takahashi | B32B 27/322 | 156/308.2 |
| 6,186,136 B1 * | 2/2001 | Osborne | B27B 17/12 | 451/298 |
| 6,425,418 B1 * | 7/2002 | Maeda | F16L 11/112 | 138/144 |
| 6,435,564 B1 * | 8/2002 | Hohmann | F16L 35/00 | 285/259 |
| 6,450,869 B1 * | 9/2002 | Sherez | B23D 59/02 | 451/449 |
| 6,561,287 B2 * | 5/2003 | DeBlasio | B28D 7/00 | 175/107 |
| 6,591,826 B1 * | 7/2003 | Donnerdal | B23Q 11/10 | 451/344 |
| 7,089,670 B2 * | 8/2006 | Donnerdal | B27B 17/0083 | 125/21 |
| 7,967,391 B1 * | 6/2011 | Dalley | B28D 7/02 | 299/39.3 |
| 8,156,966 B2 * | 4/2012 | Senet | F16L 57/00 | 156/143 |
| 9,604,297 B2 * | 3/2017 | Karlsson | B23D 59/02 | |
| 9,630,343 B2 * | 4/2017 | Vikholm | B28D 1/045 | |
| D787,908 S | 5/2017 | Hebert | D8/62 | |
| 11,376,756 B2 * | 7/2022 | Quesada Barbero | B26B 29/00 | |
| 11,654,597 B1 * | 5/2023 | Leserra | B25F 5/005 | 173/218 |
| 2002/0045415 A1 * | 4/2002 | Bath | B28D 7/02 | 451/449 |
| 2003/0070306 A1 * | 4/2003 | McDonald | B27B 9/02 | 30/371 |
| 2003/0088965 A1 * | 5/2003 | Green | F16L 33/228 | 29/520 |
| 2003/0098084 A1 * | 5/2003 | Ragner | A47L 9/24 | 138/122 |
| 2004/0042908 A1 * | 3/2004 | Donnerdal | B28D 7/02 | 451/449 |
| 2004/0051303 A1 * | 3/2004 | Lorenz | F16L 11/10 | 285/12 |
| 2004/0086322 A1 * | 5/2004 | DeLaine, Jr. | A46B 11/063 | 401/289 |
| 2005/0034715 A1 * | 2/2005 | Terpstra | B23Q 11/006 | 83/300 |
| 2005/0170758 A1 * | 8/2005 | Boyle | B24B 23/005 | 451/41 |
| 2005/0211802 A1 * | 9/2005 | Newton | F16L 41/03 | 239/548 |
| 2006/0123638 A1 * | 6/2006 | Wedel | B24B 55/052 | 30/346.58 |
| 2006/0128289 A1 * | 6/2006 | Wedel | B24B 27/08 | 451/449 |
| 2006/0240753 A1 * | 10/2006 | Ziegs | B23D 59/02 | 451/449 |
| 2006/0260453 A1 * | 11/2006 | Layher | F16K 7/065 | 137/560 |
| 2007/0221188 A1 * | 9/2007 | Donnerdal | B28D 1/048 | 125/13.01 |
| 2007/0240313 A1 * | 10/2007 | Layher | B24B 27/08 | 30/123.3 |
| 2009/0124184 A1 * | 5/2009 | Greer | B24B 23/02 | 451/449 |
| 2009/0130358 A1 * | 5/2009 | Ono | C08L 23/16 | 525/232 |
| 2011/0247714 A1 * | 10/2011 | Kanao | F16L 11/081 | 138/137 |
| 2012/0034854 A1 * | 2/2012 | Greer | B24B 23/02 | 451/344 |
| 2012/0234424 A1 * | 9/2012 | Bernhardt | F16L 11/088 | 138/137 |
| 2012/0297948 A1 * | 11/2012 | Kenton | B28D 7/02 | 251/129.01 |
| 2012/0312121 A1 * | 12/2012 | Salomon | B24B 27/08 | 74/612 |
| 2012/0312138 A1 * | 12/2012 | Salomon | B24B 55/052 | 83/169 |
| 2013/0213683 A1 * | 8/2013 | Brewster | B25F 5/026 | 173/198 |
| 2015/0151447 A1 * | 6/2015 | Petersson | B23D 47/12 | 318/722 |
| 2015/0298354 A1 * | 10/2015 | Greitmann | B28D 1/04 | 83/169 |
| 2015/0298355 A1 * | 10/2015 | Ohlendorf | B28D 7/02 | 83/169 |
| 2018/0355995 A1 * | 12/2018 | Schneider | B24B 55/02 | |
| 2020/0086521 A1 * | 3/2020 | Knight | B28D 1/045 | |
| 2021/0046367 A1 * | 2/2021 | Kibbe | A63B 69/0002 | |
| 2021/0101239 A1 * | 4/2021 | Lawenius | B23D 45/16 | |
| 2021/0219827 A1 * | 7/2021 | Ueda | G02B 23/2476 | |
| 2021/0364121 A1 * | 11/2021 | Pilone | F16L 59/147 | |
| 2022/0158289 A1 * | 5/2022 | Almqvist | B23D 57/023 | |
| 2022/0193879 A1 * | 6/2022 | Almqvist | B25F 5/006 | |
| 2023/0219151 A1 * | 7/2023 | Sumi | B25F 5/00 | 30/264 |
| 2023/0219247 A1 * | 7/2023 | Taniguchi | B26B 29/00 | 30/151 |
| 2023/0405791 A1 * | 12/2023 | Sercovich | B25F 5/008 | |
| 2024/0100645 A1 * | 3/2024 | Holzmeier | B24B 23/005 | |
| 2024/0173811 A1 * | 5/2024 | Cooner | B23Q 11/0046 | |
| 2025/0067370 A1 * | 2/2025 | Gardner | F16L 57/02 | |

* cited by examiner

UNIVERSAL ATTACHABLE WATER DIRECTING DEVICE FOR POWER TOOLS

BACKGROUND OF THE INVENTION

Field of the Invention

The present invention generally relates to the field of water cooling devices and, more particularly, to a universal attachable water directing device for supplying water to power tools while the tools are being used.

Description of the Related Art

In general, hand-held power tools (for example, stone grinding and cutting tools) often have a water supply arrangement for cooling the tools or the workpiece. The water supply arrangement is especially important for tools that produce more heat, such as cut-off machines. The water supply is typically controlled by an external valve that can be controlled before and after the tool is used. However, this can be inefficient, as it can lead to water being wasted before and after the actual cutting, or grinding, or polishing is done.

One way to improve the water cooling system for power tools is to arrange the water supply control using a shut-off valve which is linked to a power tool's throttle trigger. This enables the water supply to be turned on only when the tool is being used. This arrangement can reduce water wastage and improve efficiency. The shut-off valve that is linked to the throttle trigger of the power tool is a mechanism that controls the flow of water to the tool. When the throttle trigger is not pulled, the shut-off valve is closed, and no water flows to the tool. When the throttle trigger is pulled, the shut-off valve opens, and water flows to the tool. This mechanism ensures that water is only supplied to the tool when it is being used, which can help to reduce water wastage and improve efficiency.

However, there are some drawbacks to this approach. One is that the shut-off valve can be difficult to operate, especially when it is stiff or dirty. Additionally, if the valve is damaged, it can prevent the power tool from operating properly.

Another approach to water supply control is to use a variable flow valve. This variable flow valve allows a user to adjust the amount of water that is supplied to the power tool. This can be useful for tasks that require different amounts of water, such as cutting different materials or working in different environments. The variable flow valve allows the user to adjust the amount of water to match the specific needs of the task. This can help to improve efficiency and prevent water wastage.

However, the variable flow valves are typically more expensive and complex than simple shut-off valves, which can make them more difficult to maintain. The variable flow valves can be damaged if they are not properly maintained.

While conventional devices for supplying water to hand-held power tools may be suitable for the particular purposes employed, they would not be as suitable for the purposes of the present invention as disclosed hereafter. None of such conventional devices for supplying water disclose the unique features and advantages of the present disclosure. The devices for supplying water to the hand-held power tools disclosed herein avoid many of the drawbacks of existing devices. Further, conventional devices are not compatible with all types of hand-held power tools.

Accordingly, there is a need for a universal water directing device for supplying water to a hand-held power tool for dust-free cutting, or grinding, or polishing action.

It is one prospect of the present invention to provide a portable water directing device for facilitating a user to easily carry the device from one place to another.

Another object of the present invention is to provide a universal water directing device that can be removably attached to any hand-held power tool such as saws, drillers, and grinders thereof.

Another object of the present invention is to provide a water directing device for supplying water to a hand-held power tool that facilitates a user to control the direction and speed of the water feed.

As disclosed in this application, the inventor has discovered a universal water directing device for supplying water to a hand-held power tool that requires less space and is inexpensive.

SUMMARY OF THE INVENTION

The following presents a simplified summary of the present disclosure in a simplified form as a prelude to the more detailed description that is presented herein.

Therefore, by embodiments of the invention, there is provided a universal attachable water directing device for supplying water to a hand-held power tool.

In a preferred embodiment, the water directing device for supplying water comprises a water-supplying tube, and a pressure control unit. A connecting water line is connected to the water directing device for supplying water.

In another preferred embodiment, the water-supplying tube is fastened to a hand-held power tool. In specific, the water-supplying tube is removably fastened to the hand-held power tool through one or more fasteners. In specific, the fasteners can comprise, but are not limited to, ropes and Velcro® straps.

In another preferred embodiment, the water-supplying tube comprises an inner tube that is configured for supplying controlled water to the power tool. Further, an outer coil is wounded around the inner tube for securing the inner tube tightly in place. In specific, the inner tube is fabricated of a flexible aluminum material. The inner tube is designed to flexibly adjust at the action of a user to a desired position of the inner tube. The inner tube is coated with black rubber. Further, the outer coil is a copper coil.

In another preferred embodiment, the pressure control unit is detachably attached to a nozzle at an outlet of the water-supplying tube. The pressure control unit is configured to adjust the pressure of water supplied onto the power tool. The pressure control unit is rotated to adjust the pressure of water supplied to a point of cutting of the hand-held power tool.

In another embodiment, a flow valve is secured on a connecting water line to the water-supplying tube to control the speed and flow of the water feed. The connecting water line is attached to the water-supplying tube. The connecting water line is configured for detachably connecting to the water-supplying tube.

In a preferred embodiment, the water directing device comprises a water-supplying tube, a pressure control unit, and a flow valve. The water-supplying tube is removably fastened to a hand-held power tool. The water-supplying tube comprises a flexible aluminum inner tube and a copper outer coil. The flexible aluminum inner tube is configured for supplying controlled water to a power tool. The copper outer coil is wounded around the flexible aluminum inner tube for securing the inner tube tightly in place. In one embodiment, the copper outer coil comprises a first end and a second end. The first end is connected to a nozzle at an outlet of the water-supplying tube. The second end is connected to a connecting water line. The pressure control unit is detachably attached to the nozzle for adjusting the pressure of water supplied to the power tool, while the power tool is being used. The flow valve is secured on the connecting water line to the water-supplying tube to control the speed and flow of the water feed. The connecting water line is detachably connected to the water-supplying tube.

BRIEF DESCRIPTION OF THE DRAWINGS

Illustrative embodiments of the present invention are described herein with reference to the accompanying drawings, in which.

DETAILED DESCRIPTION

Figure 1:
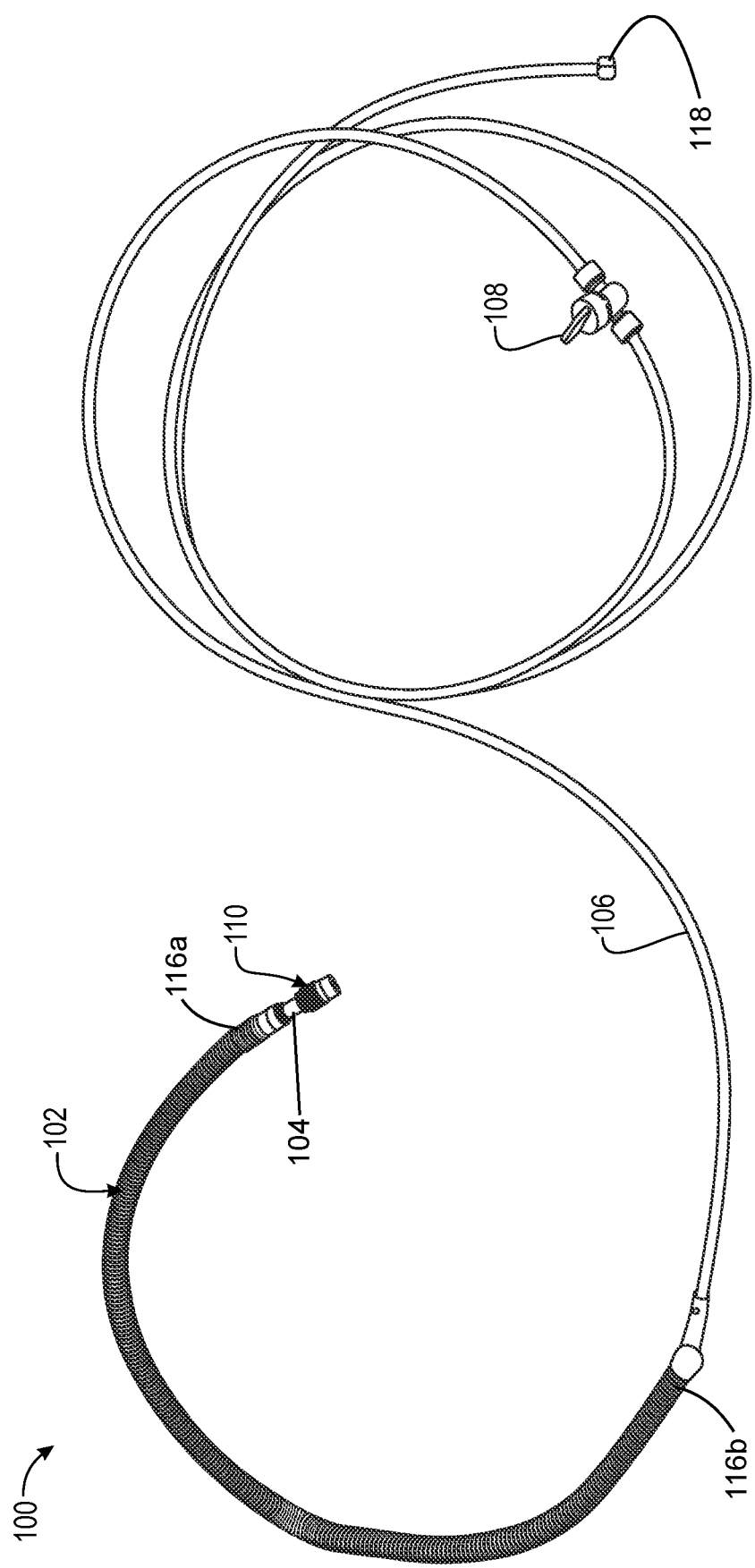
FIG. 1 depicts a perspective view of a universal water directing device for supplying water to a hand-held power tool, in accordance with embodiments of the invention.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

The present disclosure has been made with a view towards solving the problem with the prior art described above, and it is an object of the present invention to provide a universal removable water directing device for supplying water to a hand-held power tool.

Referring initially to FIGS. 1-7, the basic constructional details and principles of operation of embodiments of a water directing device 100 for supplying water to the hand-held power tool are provided.

Figure 2:
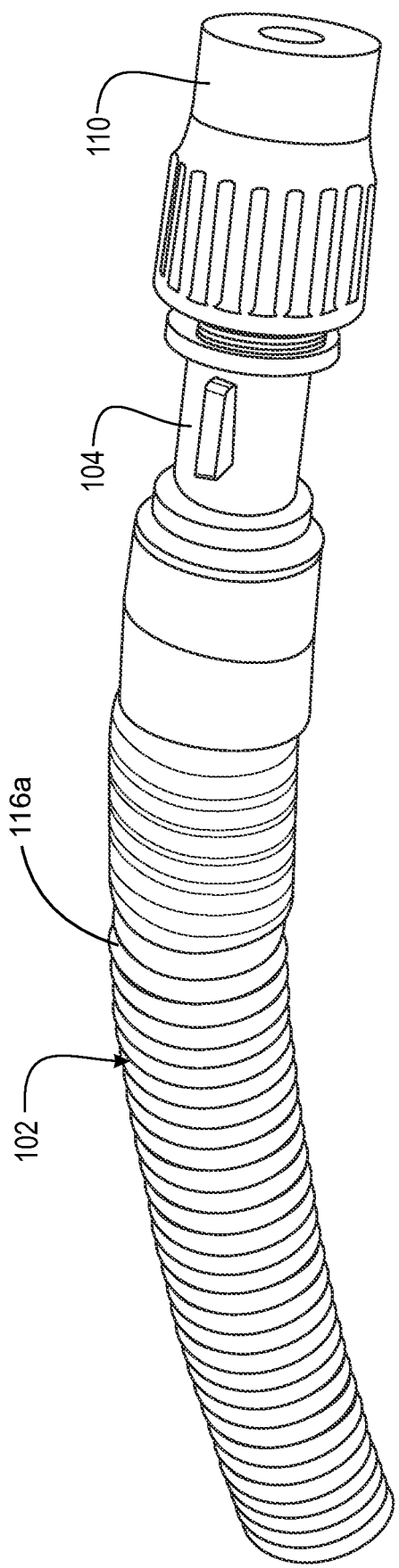
FIG. 2 depicts a perspective view of a water-supplying tube of the water directing device, in accordance with embodiments of the invention.
Figure 3:
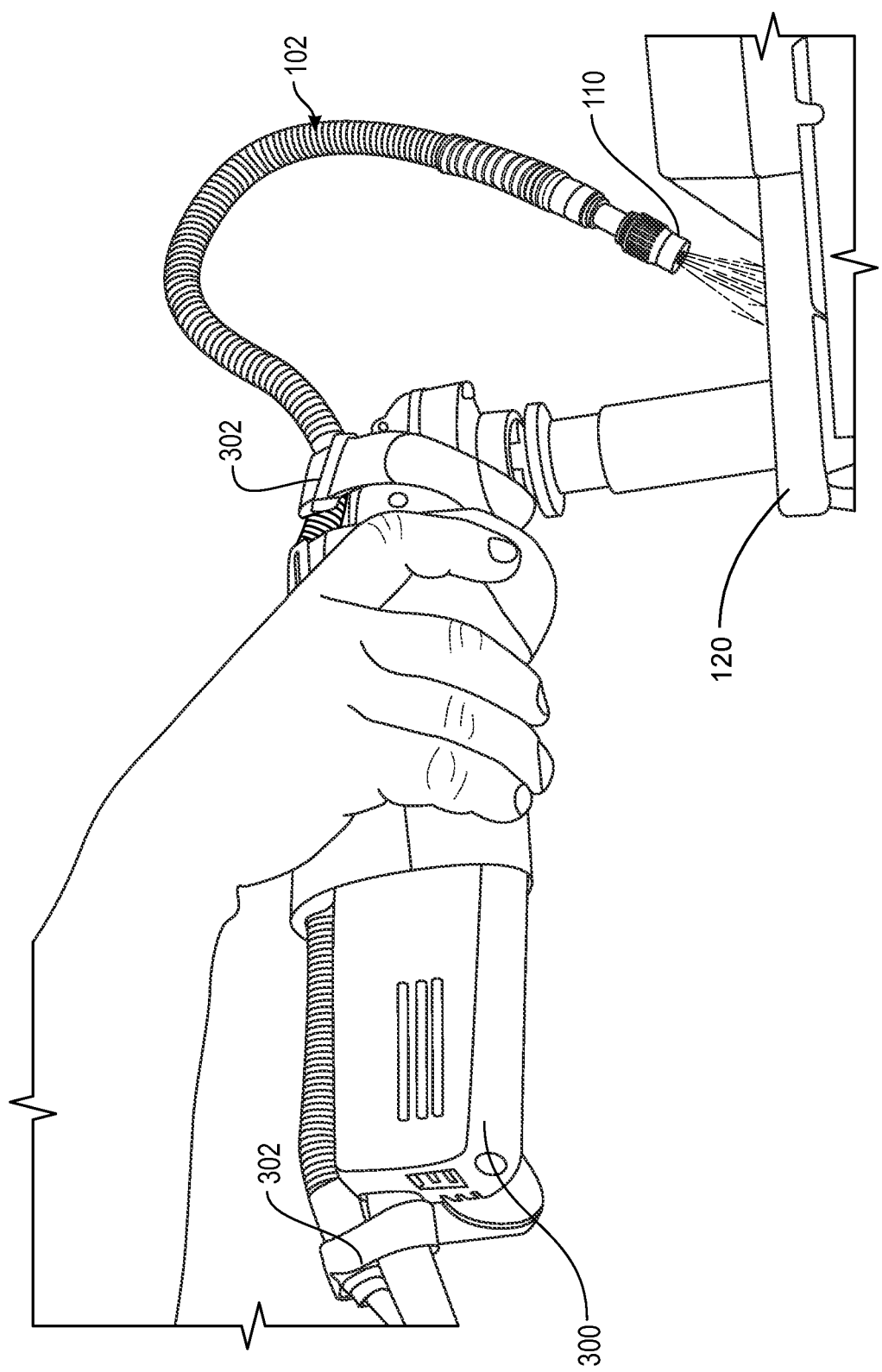
FIG. 3, depicts a perspective view of the water directing device fastened to a hand-held power tool, in accordance with embodiments of the invention.
Figure 4:
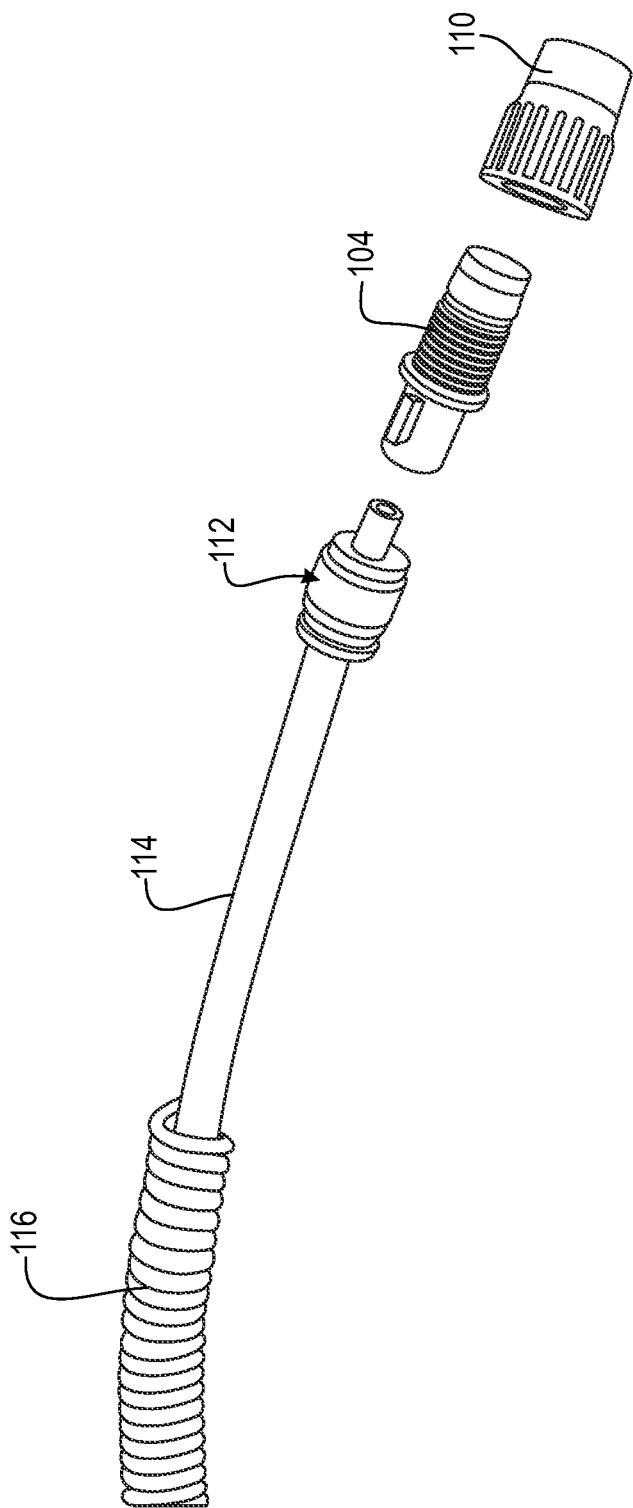
FIG. 4 depicts a perspective view of a disassembled water-supplying tube and water outlet parts, in accordance with some embodiments of the disclosure.
Figure 5:
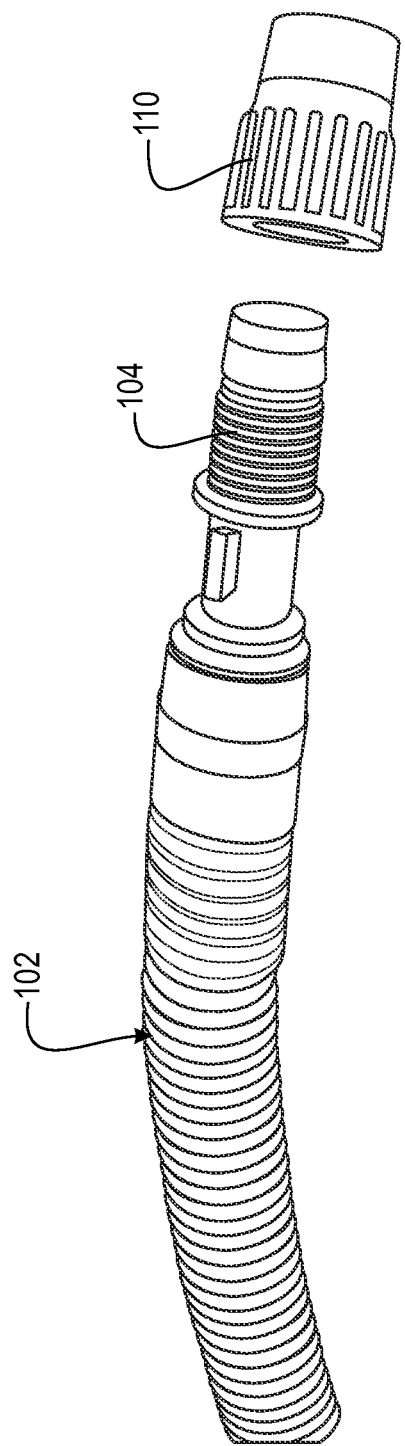
FIG. 5 depicts a perspective view of a dissembled water-supplying tube and a pressure control unit, in accordance with some embodiments of the disclosure.
Figure 6:
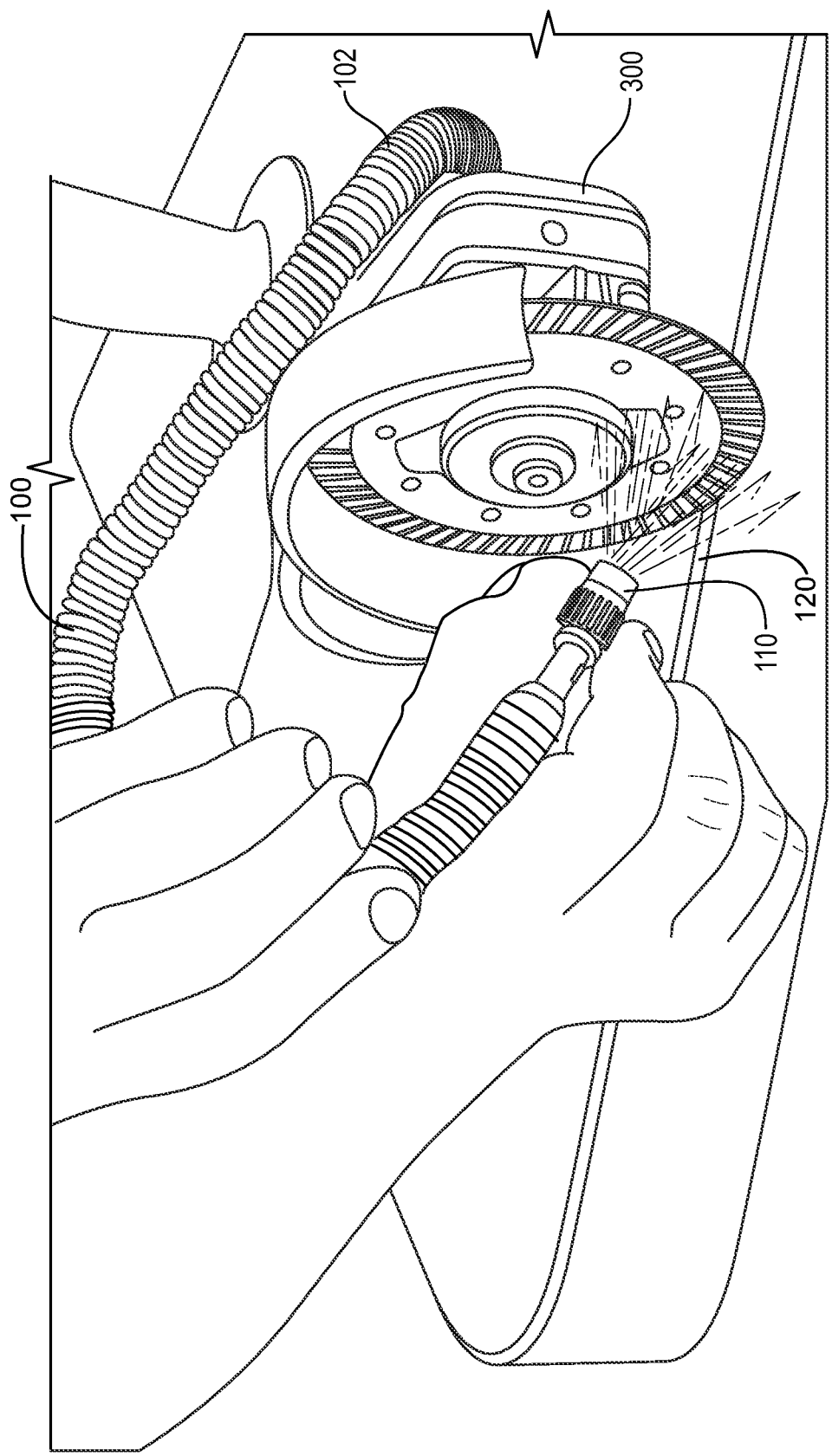
FIG. 6 depicts a perspective view of rotation of the pressure control unit to adjust the pressure of water supplied onto a power tool, in accordance with some embodiments of the disclosure.
Figure 7:
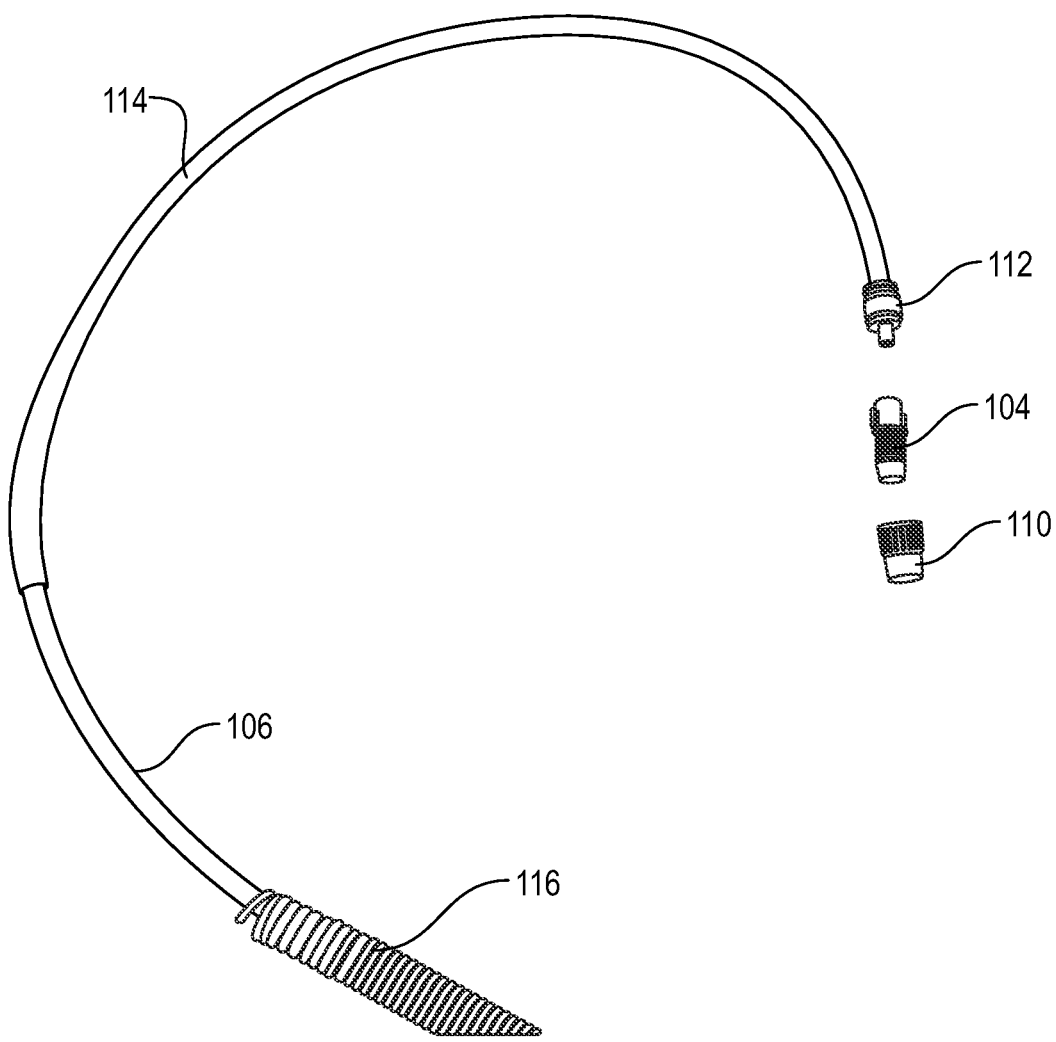
FIG. 7 depicts a perspective view of the water directing device with a pulled back position of an outer coil, in accordance with some embodiments of the disclosure.

As illustrated, FIG. 1 depicts a perspective view of the water directing device 100 for supplying water to the hand-held power tool. FIG. 2 depicts a perspective view of a water-supplying tube 102 of the water directing device 100. FIG. 3 depicts a perspective view of the water directing device 100 removably fastened to a hand-held power tool 300. FIG. 4 depicts a perspective view of a disassembled water-supplying tube 102 and water outlet parts. FIG. 5 depicts a perspective view of a dissembled water-supplying tube 102 and a pressure control unit 110. FIG. 6 depicts a perspective view of rotation of the pressure control unit 110 to adjust the pressure of water supplied onto a power tool 300. FIG. 7 depicts a perspective view of the water directing device 100 with a pulled back position of an outer coil 116.

Referring to FIG. 1, a perspective view of the water directing device 100 for supplying water to a hand-held power tool 300 is depicted. The water directing device 100 for supplying water comprises a water-supplying tube 102, a pressure control unit 110, and a connecting water line 106 which is configured with a flow valve 108. As illustrated in FIG. 1, at an end of the connecting water line 106 is an adapter 118, such as a garden hose adapter, that can connect the connecting water line 106 to a water source, such as a garden hose.

Referring to FIG. 2, a perspective view of the water-supplying tube 102 of the water directing device 100 is depicted. The water-supplying tube 102 of the water directing device 100 is fastened to a hand-held power tool 300, as depicted in FIG. 3. In specific, the water-supplying tube 102 is fastened to the hand-held power tool 300 through one or more fasteners 302. The fasteners 302 can comprise, but are not limited to, ropes, Velcro® straps, or any other means that can securely attach the water-supplying tube 102 to the hand-held power tool 300. As illustrated in FIG. 3, for example, a Velcro® type of strap (i.e., hook and loop fastener strap) connects on one end of the water-supplying tube 102, surrounds the outer coil portion 116, wraps around the power tool 300, and connects back to itself. As can be seen and appreciated from the disclosure herein, the water directing device 100 is easily attachable to and removable from any hand-held power tool 300, such as cutting saws, drills, and grinders, for stone, masonry, and tile work. The fasteners 302 removably attach and secure the water directing device 100 to the power tool 300, and the water directing device 100 remains attached to the power tool 300 while the power tool 300 is being used.

Through embodiments disclosed herein, the positions of the water-supplying tube 102 of the water directing device 100 can be adjusted relative to the power tool 300 and the substrate material 120, at the option of the user, to enable the pressure control unit 110 to be directed toward the power tool 300 and respective substrate material 120 being cut, drilled, and/or grinded by the power tool 300, such as the masonry drill power tool 300, illustrated in FIG. 3, and such as the stone cutting saw power tool 300, illustrated in FIG.

6. This adjustment allows the water to flow with sufficient pressure, and at an operator's desired angle, onto the power tool 300 and onto the respective substrate material 120 that is being cut or drilled or polished, while the power tool 300 is being operated. In such manner, embodiments of the invention disclosed herein provide a controlled water attachment device 100 that provides an efficient and dependable solution for mitigating silica dusk particles at a point of cutting, grinding, and/or drilling, for nearly all cutting, grinding and drilling power tools 300 for stone, tile, and masonry work. A user or operator of a power tool 300 and the water directing device 100 can easily position the device 100 alongside the selected power tool 300, attach the device 100 to the power tool 300 with hook and loop fastening straps 302, and connect the adapter 118 of the connecting water line 106 to a water source such as a garden hose. The flow valve 108 of the water directing device 100 controls the rate of flow of water through the water connecting device 100, at the option of the user or operator.

Referring to FIG. 4, a perspective view of a disassembled water-supplying tube 102 and water outlet parts is depicted. The water-supplying tube 102 comprises an inner tube 114 that is configured for supplying water to the power tool 300. In a preferred embodiment, the inner tube 114 is fabricated of a flexible aluminum material. In a preferred embodiment, the inner tube 114 is designed to flexibly adjust, at the action of the user to a desired position of the inner tube 114. In a preferred embodiment, the inner tube 114 is coated with black rubber. Accordingly, in a preferred embodiment, the rubber coated flexible aluminum inner tube 114 is positioned at the action of the user. This makes the inner tube 114 durable and resistant to abrasion. As can be appreciated from the disclosure herein, the rubber coated flexible aluminum inner tube 114 is held inside the outer coil 116.

As exemplified in FIG. 4, the outer coil 116 is wound around the inner tube 114 for securing the inner tube 114 tightly in position. The outer coil 116 helps facilitate positioning of the water directing device 100 at nearly any desired angle. The outer coil 116 is preferably made of a strong material such as copper. The outer coil 116 helps make the water directing device 100 durable while remaining flexible. In a preferred embodiment, the copper outer coil 116 is wounded around the rubber coated flexible aluminum inner tube 114 for securing the inner tube 114 tightly in place and for facilitating adjustment of the water directing device 100 into a variety of temporarily fixed positions, at the option of the user, while operating the power tool 300.

In a preferred embodiment, the copper outer coil 116 comprises a first end 116a and a second end 116b. The inner tube 114 and the first end 116a of the copper outer coil 116 are connected to a nozzle 104 at an outlet 112 of the water-supplying tube 102. As illustrated in FIGS. 3-5. The inner tube 114 and the second end 116b of the copper outer coil 116 are connected to a connecting water line 106.

The water outlet parts include the outlet 112, the nozzle 104, and the pressure control unit 110, as illustrated in the exploded view in FIG. 4 in a disassembled position.

Referring to FIG. 5, a perspective view of the disassembled water-supplying tube 102 and the pressure control unit 110 is depicted. The pressure control unit 110 is detachably attached to the nozzle 104 at the outlet 112 of the water-supplying tube 102 for adjusting the pressure of water supplied to the power tool 300, while the power tool 300 is being used. The pressure control unit 110 is easily removed from the water-supplying tube 102 for cleaning or replacement. The pressure control unit 110 is configured to adjust the pressure of water supplied to and directed at a point of cutting between the material substrate 120 and the hand-held power tool 300 by rotating the pressure control unit 110 clockwise or counter-clockwise, to achieve the desired water pressure while the power tool 300 is being used, as depicted in FIG. 6.

As illustrated herein, in one embodiment, the pressure control unit 110 position can be adjusted manually for the operation of the power tool 300. In one embodiment herein, the pressure control unit 110 position can be adjusted manually while the power tool 300 is being operated. The pressure control unit 110 preferably comprises a knob, a dial, or any other device that is used to adjust the pressure of water. The pressure control unit 110 is made of a material that is resistant to water and corrosion such as plastic, metal, and rubber. In a preferred embodiment herein, the pressure control unit 110 is connected to the water-supplying tube 102 through a snap-fit connection.

Referring to FIG. 7, a perspective view of the water directing device 100 with a pulled back position of the outer coil 116, is depicted. A connecting water line 106 is connected to the water-supplying tube 102. The connecting water line 106 is configured for detachably connecting to the water-supplying tube 102. In specific, the connecting water line 106 is made of a material that is resistant to water and corrosion, such as vinyl, rubber, and plastic. The connecting water line 106 is configured with a flow valve 108 that allows the flow of water to be adjusted from a water-supplying unit through the water-supplying tube 102 and onto the power tool 300. In a preferred embodiment, the flow valve 108 is secured on the connecting water line 106 to the water-supplying tube 102 to control the speed and flow of the water feed. The connecting water line 106 is connected to the water-supplying tube 102, as illustrated in FIG. 7.

The universal water directing device 100 is removably fastened to any hand-held power tool 300 such as saws, drillers, and grinders for providing dust-free cutting, grinding, or polishing action, at the option of the operator of the power tool 300. The water directing device 100 is a compact and portable device that allows a user to easily carry the universal water directing device 100 from one place to another. The universal water directing device 100 enables a user to control the direction and speed of the water feed onto the power tool 300 and substrate material 120. The water directing device 100 requires less space than conventional devices and is less expensive to fabricate and produce.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:

1. A water directing device for attachment to a hand-held power tool, comprising:
   a nozzle;
   an inner tube manufactured of a metallic material, a first end of the inner tube connected to the nozzle;
   a rubber coating that extends along a length of the inner tube;
   an outer coil wound around the rubber coating, a first end of the outer coil connected to the nozzle;
   a fastener mounted to the outer coil for attachment to a hand-held power tool;

a pressure control unit mounted to the nozzle to adjust the pressure of water supplied therethrough;
an adapter for connection to a water supply; and
a connecting water line mounted to the adapter and to the inner tube to communicate water therethrough.

2. The tool as recited in claim 1, wherein the inner tube is manufactured of aluminum.

3. The tool as recited in claim 2, wherein the outer coil is manufactured of copper.

4. The tool as recited in claim 3, wherein the pressure control unit is threaded to the nozzle, the relative position of the pressure control unit with respect to the nozzle configured to adjust the pressure of water supplied therethrough.

5. The tool as recited in claim 1, wherein the adapter is a threaded connector for attachment to a garden hose.

6. The tool as recited in claim 5, further comprising a flow valve along the connecting water line, the flow valve operable to control a flow of water from the water-supply.

7. The tool as recited in claim 6, wherein the connecting water line is of a length greater than a length of the inner tube.

8. The tool as recited in claim 7, wherein a second end of the outer coil is connected to the connecting water line.

9. The tool as recited in claim 1, wherein the fastener surrounds the outer coil portion, wraps around the power tool, and connects back to itself.

10. The tool as recited in claim 9, wherein the fastener is of a hook and loop material.

11. A water directing device for attachment to a hand-held power tool, comprising:

a nozzle;
an inner tube manufactured of a flexible aluminum material, a first end of the inner tube connected to the nozzle;
a rubber coating that extends along a length of the inner tube;
an outer coil manufactured of copper, the outer coil wound around the rubber coating, a first end of the outer coil connected to the nozzle;
a fastener mounted to the outer coil for attachment to a hand-held power tool, wherein the fastener surrounds the outer coil portion, wraps around the power tool, and connects back to itself;
a pressure control unit threaded to the nozzle, wherein the relative position of the pressure control unit with respect to the nozzle configured to adjust the pressure of water supplied therethrough;
an adapter for connection to a water supply, wherein the adapter is a threaded connector for attachment to a garden hose;
a connecting water line mounted to the adapter and to the inner tube to communicate water therethrough, wherein the connecting water line is of a length greater than a length of the inner tube; and
a flow valve along the connecting water line, the flow valve operable to control a flow of water from the water-supply.

12. The tool as recited in claim 11, wherein a second end of the outer coil is connected to the connecting water line.

* * * * *